US008633803B2

(12) United States Patent
Mo et al.

(10) Patent No.: US 8,633,803 B2
(45) Date of Patent: Jan. 21, 2014

(54) APPARATUS AND METHOD FOR LOCATING RFID TAG (75) Inventors: Sang-Hyun Mo, Daejeon (KR); Jae-Heum Lee, Daejeon (KR); Seung-Il Myong, Daejeon (KR); Hoe-Sung Yang, Daejeon (KR); Heyung-Sub Lee, Daejeon (KR); Jong-Suk Chae, Daejeon (KR); Jongsub Cha, Daejeon (KR); Kang-Bok Lee, Daejeon (KR); Dong-Beom Shin, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 427 days.

(21) Appl. No.: 12/646,784

(22) Filed: Dec. 23, 2009

(65) Prior Publication Data
US 2010/0214067 A1 Aug. 26, 2010

(30) Foreign Application Priority Data

Feb. 25, 2009 (KR) .................. 10-2009-0015811
Apr. 15, 2009 (KR) .................. 10-2009-0032723

(51) Int. Cl.
*H04Q 5/22* (2006.01)
(52) U.S. Cl.
USPC .......................................... 340/10.1
(58) Field of Classification Search
USPC ........... 340/10.1, 505, 12.5; 705/28; 455/41.2
See application file for complete search history.

(56) References Cited

U.S. PATENT DOCUMENTS

| 5,940,006 A * | 8/1999 | MacLellan et al. ........... 370/314 |
| 7,319,397 B2 | 1/2008 | Chung et al. |
| 2008/0111693 A1 | 5/2008 | Johnson et al. |
| 2008/0231451 A1 * | 9/2008 | Kamel ....................... 340/572.1 |

FOREIGN PATENT DOCUMENTS

| JP | 2005-140637 | 6/2005 |
| JP | 2008-040550 | 2/2008 |
| KR | 1020050080563 A | 8/2005 |
| KR | 1020050119582 | 12/2005 |
| KR | 1020060130715 A | 12/2006 |
| KR | 1020080035385 A | 4/2008 |
| KR | 10-2010-0088396 | 8/2010 |

OTHER PUBLICATIONS

Ph.D. Jongsub Cha, "ISO/IEC 24730-2 REV1 NWIP", Mar. 2009.
Information Technology—Real Time Locating Systems (RTLS-Part 2: 2, 4 GHz Air Interface Protocol, ISO/IEC FDIS 24730-2:2006(E), Mar. 2006.

* cited by examiner

*Primary Examiner* — Vernal Brown
(74) *Attorney, Agent, or Firm* — Blakely Sokoloff Taylor & Zafman (57) ABSTRACT

Provided are a Radio Frequency Identification (RFID) tag and apparatus and method for locating a RFID tag without comparing arrival times of blink signals transmitted from the RFID tag in order to quickly trace a location of the RFID tag. The RFID tag includes a tag ID generator configured to generate a tag ID of the RFID tag, a blink generator configured to generate a plurality of sub-blink signals that form the blink signal, a sub-blink ID generator configured to generate sub-blink IDs for the generated sub-blink signals, a sub-blink ID inserter configured to insert the generated sub-blink IDs into the sub-blink signals, and a transmitter configured to transmit the blink signal having the tag ID and the sub-blink IDs.

14 Claims, 7 Drawing Sheets

DSSS 152-bit message format

| Preamble | RTLS transmitter status | | | | RTLS transmitter ID | Payload | | | CRC |
|---|---|---|---|---|---|---|---|---|---|
| 8 | X | S2 | S1 | B | 32 | 69 | | | 12 |
| 8 | X | S2 | S1 | B | 32 | 60-DF | 16 ext ID | 72 | 12 |
| Bit 151 to bit 144 | Bit 143 to bit 140 | | | | Bit 139 to bit 108 | Bit 107 to bit 100 | Bit 99 to bit 84 | Bit 83 to bit 12 | Bit 11 to bit 0 |

501

Sub-blink ID : 3bits(bit 100 to bit 102)

APPARATUS AND METHOD FOR LOCATING RFID TAG

CROSS-REFERENCE(S) TO RELATED APPLICATIONS

The present invention claims priority of Korean Patent Application Nos. 10-2009-0015811 and 10-2009-0032723, filed on Feb. 25, 2009 and Apr. 15, 2009, which are incorporated herein by reference in their entirety.

BACKGROUND OF THE INVENTION

1. Field of the Invention

The present invention relates to a Radio Frequency Identification (RFID) tag and an apparatus and method for locating a RFID tag, and more particularly, to an apparatus and method for locating a RFID tag without comparing arrival times of blink signals transmitted from the RFID tag in order to quickly trace a location of the REID tag.

2. Description of Related Art

A Radio Frequency Identification (RFID) technology was introduced to recognize, locate, and identify a target object including a person and an animal in wireless manner. Lately, the RFID technology has been frequently used in daily life. For example, one of representative applications of the RFID technology is a barcode system or a magnetic card system. Such a RFID technology has been continuously advanced to satisfy various demands from users and to overcome shortcomings of a barcode system or a magnetic card system.

In general, a RFID card indicates a contactless card. Unlike a contact card, it is not necessary for a user to insert a RFID card into a reader. Accordingly, the RFID card is less damaged or contaminated by peripheral environment.

A RFID system includes a tag, a reader, and a data processing system for processing data read from the tag. The tag and the reader communicate with each other through a wireless link.

The tag internally includes a memory, an integrated circuit (IC), a microprocessor, and an antenna. The tag is classified into an active tag and a passive tag by an internal energy source.

The active tag includes an own power supply and the passive tag receives power from the reader through induction current. Accordingly, it is possible to locate the active tag from a comparative long distance compared to the passive tag.

The antenna of the reader continuously transmits a radio wave. When a tag storing ID and data enters a radio wave coverage of the antenna, the tag transmits the ID and stored data to the antenna.

A RFID system includes a RFID tag (transponder) for storing unique information, a RFID reader for reading and decoding data stored in the RFID tag, a host computer (server) for processing data read from the RFID tag, application software, and a network.

The RFID tag is also referred as a transponder which is a compound word of a transmitter and a responder. The RFID tag includes an IC chip and an antenna circuit. The RFID tag communicates with the reader through the antenna and a RF module.

The RFID tag is classified by a size, a shape, and a type of a memory for storing data. Particularly, the RFID tag can be classified into a read-only RFID tag, a read/write RFID tag, and a write once read many (WORM) RFID tag by a memory type.

As described above, the RFID tag is also classified into an active tag and a passive tag according to whether a RFID tag internally includes a power supply or not. In case of the active tag, the RFID tag transmits and receives data using the own power supply. In case of the passive tag, a RFID tag transmits and receives data through induction current from a reader.

Accordingly, it is possible to track the active tag even from a comparative long distance compared to the passive tag. However, the passive tag has advantages of light-weighted, low cost, and long lifespan. Accordingly, the passive tag is generally used when a tag is required to frequently communicate with a reader, when a tag is required to communicate with a reader for a long time, and when a tag is required to have no limitation to store data.

Since a passive tag has limitation in a distance, a system using an active RFID tag has been receiving attention. The active tag is disadvantageously required to include a power supply. On the contrary, the active tag is convenient to use and advantageously provides various services. The active tag can be designed in various types according to a frequency band and a use purpose.

A low frequency RFID system uses a frequency range of 30 kHz to 500 kHz and is used in a short transmission area such as 1.8 m. A radio frequency RFID system uses a frequency range of 850 MHz to 950 MHz or a frequency range of 2.4 GHz to 2.5 GHz and is a long distance transmission area such as 27 m.

Hereinafter, a method for locating an active RFID tag in a RFID system according to the related art will be described.

A Real-Time Location System (RTLS) is a system for locating a target object such as a person or an object in real time using a RFID and sensor technology and a network technology. That is, since the RTLS provides a real time service of locating a target object, the RTLS must calculate and confirm a location of a target object within 30 seconds after the RTLS receives blinking information from an active RFID tag.

The RTLS provides various services through interacting with many external systems. The most RTLSs in a market are an active RFID system using a wireless communication system based on 2.45 GHz frequency band.

The RTLS uses one of a triangulation based locating method and a finger printing based locating method to calculate a location of a tag. In general, the triangulation based locating method is used to locate a target object due to the advantages of triangulation such as convenience and easy operation of related equipment.

The triangulation based locating method includes two processing steps: measuring a distance and calculating a location through triangulation. Since the triangulation is well known algorithm, it is very easy to realize the process step of calculating a location if distances are given. Since various distance measuring methods have been introduced, it is very important to deeply understand the characteristics of each distance measuring method in order to carefully select one proper to a locating system.

Representative distance measuring methods are a received signal strength intensity (RSSI) based method using an intensity of a received signal, a time of flight (TOF) based method using a time taken to transfer a signal between devices, a time different of flight (TDOF) based method using a difference of flight times of radio waves, an angle of arrival (AOA) based method using an angle of arrival of radio wave, and a phase of arrival method using a phase of arrival of a radio wave. The RSSI based method, the TOA based method, and the TDOA based method have been widely used. The TDOA based method is also referred as a TOF based method and a TDOF based method.

Hereinafter, a method for locating a target object in a RTLS according to the related art will be described with reference to the accompanying drawings.

Figure 1:
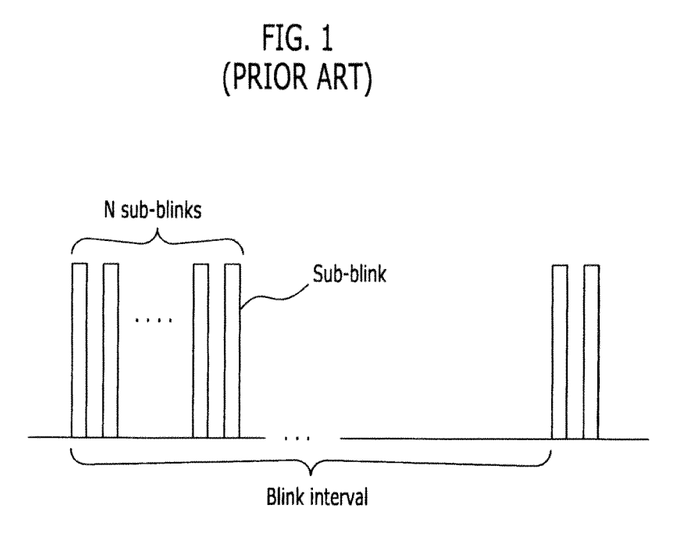
FIG. 1 is a diagram illustrating a Direct Sequence Spread Spectrum (DSSS) signal transmitted from a RTLS tag. The DDSS signal is defined in ISO/IEC 24730-2.

FIG. 1 is a diagram illustrating a Direct Sequence Spread Spectrum (DSSS) signal transmitted from a RTLS tag. The DDSS signal is defined in ISO/IEC 24730-2.

As shown in FIG. 1, a RTLS tag transmits a blink signal modulated by the Direct Sequence Spread Spectrum (DSSS) scheme at a blink interval for example minimum 5 seconds. Each blink is formed of N sub blinks. Each sub blink is transmitted using one selected from four message types defined in ISO/IEC 24730-2. For example, each blink includes one to eight sub blinks. In order to obtain time diversity, the sub-blinks have a randomized sub-blink interval of 125 ms±16 ms.

A location processor engine calculates a location using a TDOA algorithm based on an arrival time of received sub blink from a RTLS reader. In order to calculate a location of a RTLS tag, the location processor engine needs at least three arrival times of sub blinks from readers. The location processor engine calculates a time difference of the arrival times of sub blinks using a TDOA algorithm. In order to accurately calculate, it is necessary to group sub blink arrival time information by the same transmission time among N sub blink transmissions. If they are wrongly grouped, a sub blink interval will have a time different error about of 125 ms±16 ms. If the location of a RTLS tag is calculated using this wrong information, it may cause error greater than 3 m which is proposed in ISO/IEC 24730-2.

Figure 2A:
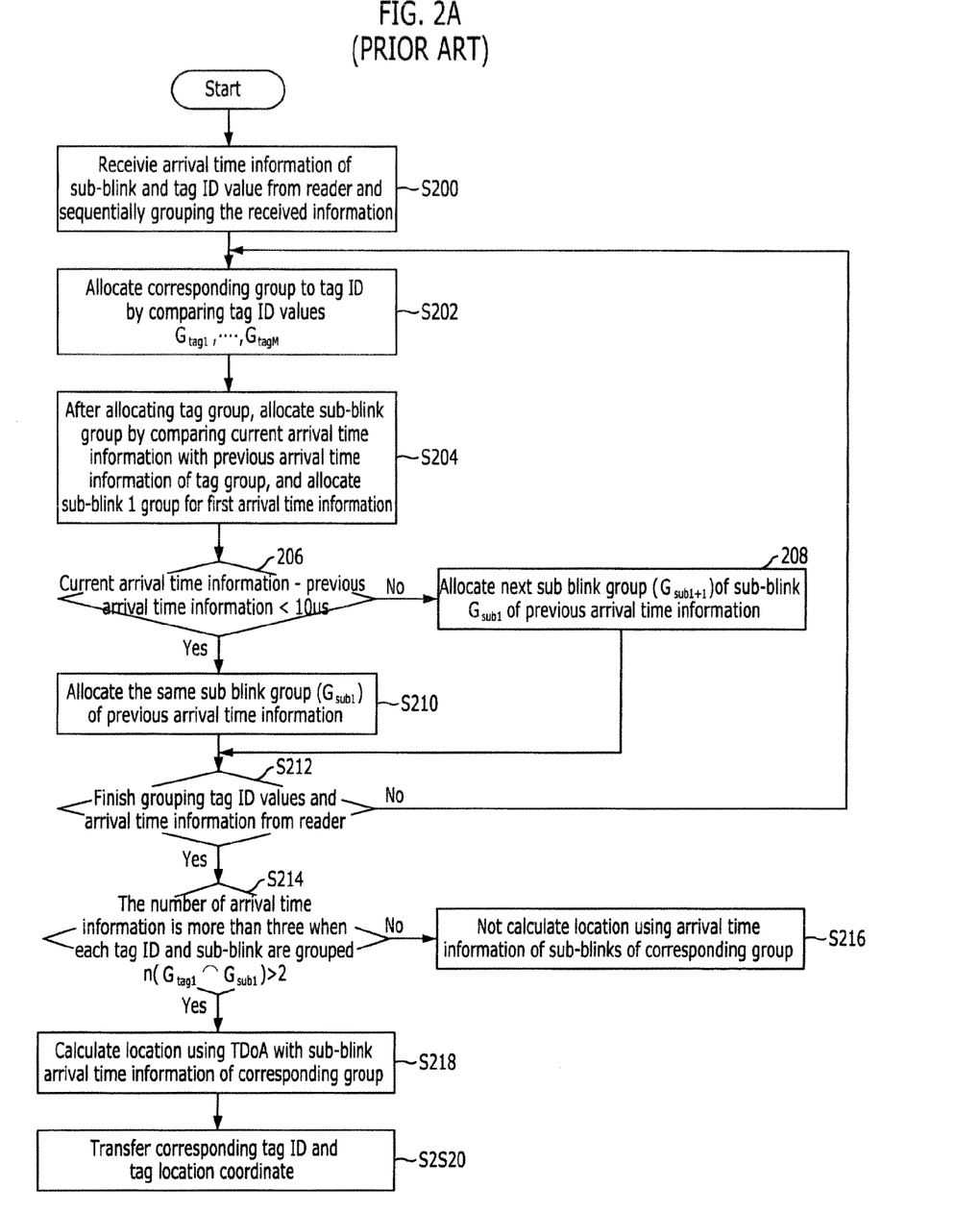
FIG. 2A is a flowchart illustrating a method of locating a RTLS tag according to the related art.

FIG. 2A is a flowchart illustrating a method of locating a RTLS tag in a location processor engine when a plurality of RTLS tags transmit a blink signal according to an ISO/IEC 24730-2.

Each RTLS tag is an active REID having a unique ID. Each RTLS tag is attached to a target object such as an object or a person. The RTLS tag regularly transmits own information to a reader. At step 200, a location processor engine receives information about arrival times of sub blinks and tag ID values from a plurality of tags and sequentially groups the received information. At step S202, the received information is grouped by the same tag ID by comparing the tag ID values.

At step S204, a sub blink group is allocated by comparing current arrival time information with previous arrival time information in the allocated tag ID group. If there is not previous arrival time information because it is the first arrival time information, the first sub blink group is allocated.

At step S206, if a time difference of the previous arrival time and the current arrival time is shorter than about 10 μs, the current arrival time information is determined as arrival time information of a sub-blink transmitted at the same transmission time. At step S210, the same sub-blink group of the previous arrival time information is allocated to the current sub blink arrival time information.

10 μs is a sub-blink arrival time based on a speed of propagation of radio wave when a RTLS tag and a RTLS reader are separated at about 3 km. Further, since it is a further wider range of 300 m which is defined in ISO/IEC 24730-2 standard, 10 μs can be an enough threshold value to group sub-blink arrival time information.

If the time difference is greater than 10 μs at step 2208, the current arrival time information is determined as arrival time information of sub-blink not transmitted at the same transmission time. Therefore, a next sub-blink group is allocated to.

Figure 2B:
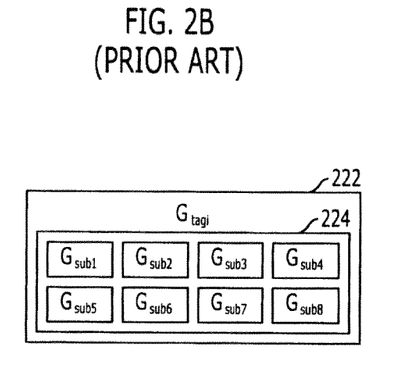
FIG. 2B is a diagram illustrating sub-blink arrival time information grouped according to the related art.

At step S212, the arrival time information and the tag ID values from readers are grouped by repeating the above processes. After finishing grouping the received information, the information is group as shown in FIG. 2B. As shown in FIG. 2B, the tag ID-grouped information $G_{tagi}$ 222 includes sub-blink grouped information $G_{subi}$ 224. The tag ID-grouped information $G_{tagi}$ 222 corresponds to the number of RTLS tags used to locate a RTLS tag. The sub-blink grouped information $G_{subi}$ 224 corresponds to the number of sub-blink arrival time information received from reader. The tag ID-grouped information $G_{tagi}$ 222 may include one to eight sub-blink grouped information $G_{subi}$ 224.

After finishing grouping, it is determined whether the sub-blink arrival time information is more than three or not at step S214. If it is more than three, a location of the RTLS tag is calculated using a TDOA algorithm at step S218. At step S220, a coordinate and a corresponding tag ID of the calculated RTLS tag is transmitted to a server.

If the number of sub-blink arrival time information is less than three, it is impossible to calculate a location of the RTLS tag. Accordingly, a location of the RTLS tag is not calculated and corresponding data is dumped at step S216.

However, the method of locating a RTLS tag in a RTLS system according to the related art requires additional algorithm to group sub-blink arrival time information which is required to calculate a location of a RTLS tag in a location processor engine. Further, it is necessary to compare the sub-blink arrival time information through the predetermined algorithm. Accordingly, the method of locating a RTLS tag according to the related art is inefficient.

SUMMARY OF THE INVENTION

An embodiment of the present invention is directed to providing an apparatus and method for locating a radio frequency identification (RFID) tag without comparing arrival time information of sub-blinks in order to quickly trace a RFID tag.

In accordance with an aspect of the present invention, there is provided a radio frequency identification (RFID) tag for transmitting a blink signal to locate a position of a target object, including a tag ID generator configured to generate a tag ID of the RFID tag, a blink generator configured to generate a plurality of sub-blink signals that form the blink signal, a sub-blink ID generator configured to generate sub-blink IDs for the generated sub-blink signals, a sub-blink ID inserter configured to insert the generated sub-blink IDs into the sub-blink signals, and a transmitter configured to transmit the blink signal having the tag ID and the sub-blink IDs.

In accordance with an aspect of the present invention, there is provided a method for controlling a radio frequency identification (RFID) tag, including generating a tag ID of the RFID tag, generating a plurality of sub-blink signals that form the blink signal, generating sub-blink identifications (ID) for the generated sub-blink signals and inserting the generated sub-blink IDs to the sub-blink signals, and transmitting the blink signals having the tag ID and the sub-blink IDs.

In accordance with an aspect of the present invention, there is provided an apparatus for locating a radio frequency identification (RFID) tag that transmits a blink signal, including a blink signal receiver configured to receive a plurality of sub-blink signals having a tag ID and sub-blink IDs of each RFID tag from a plurality of radio RFID tags, a memory configured to store information including tag IDs and sub-blink IDs of each one of the plurality of sub-blink signals, and arrival time information of each one of the plurality of sub-blink signals, a first grouping unit configured to group the stored information by a same tag ID among the stored tag IDs, a second grouping unit configured to group the tag-ID grouped information by a same sub-blink ID among the stored sub-blink IDs, and a tag location calculator configured to calculates a coordinate of the RFID tag when the number of the grouped sub-blink IDS is more than three.

In accordance with an aspect of the present invention, there is provided a method for tracking a location of a radio frequency identification (RFID) tag that transmits a blink signal, including receiving a plurality of sub-blink signals including a tag ID and sub-blink IDs of each RFID tag from the plurality of RFID tags, storing information including the tag IDs, the sub-blink IDs, and arrival time information of the plurality of sub-blink signals, grouping the stored information by a same tag ID among the stored tag IDs, grouping the tag-ID grouped information by a same sub-blink ID among the stored sub-blink IDs, and calculating a coordinate of the RFID tag when the number of the grouped sub-blink IDS is more than three.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 3:
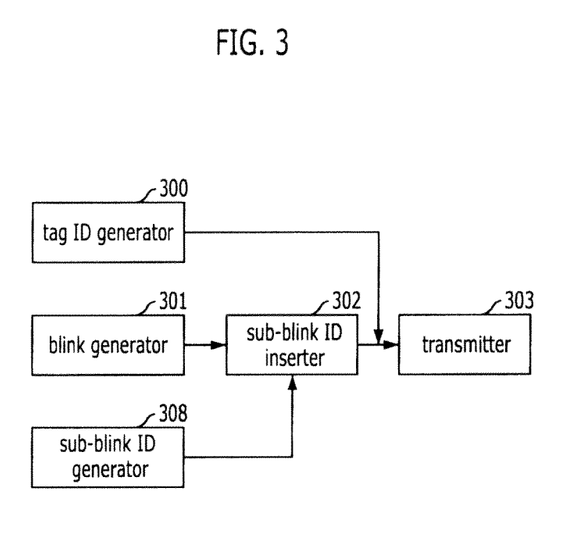
FIG. 3 is a diagram illustrating a Real Time Locating System (RTLS) tag in accordance with an embodiment of the present invention.

FIG. 3 is a diagram illustrating a Real Time Locating System (RTLS) tag that transmits a blink signal for locating a position of a target object in accordance with an embodiment of the present invention.

The RTLS tag includes a tag ID generator 300, a blink generator 301, a sub-blink ID generator 308, a sub-blink ID inserter 302, and a transmitter 303.

The tag ID generator 300 generates an identifier (ID) of each RTLS tag. The ID includes a unique ID value for each RTLS tag to identify a target object with a corresponding RTLS tag attached to. The RTLS tag regularly transmits own tag ID information to a reader. Accordingly, it is possible to detect a moving path of a RTLS tag by classifying tag ID information by an ID of a RTLS tag and regularly transmitting tag ID information.

The blink generator 301 generates N sub-blink signals. For example, the blink generator 301 may generate at least one to eight sub-blink signals. The generated sub-blink signals may be transmitted using one of four message types introduced in ISO/IEC24730-2.

The sub-blink ID generator 308 generates a sub-blink ID according to a generation time order of each sub-blink. The sub-blink ID inserter 302 inserts the generated sub-blink ID into each sub-blink signal.

The transmitter 303 modulates the sub-blink signal having the tag ID from the tag ID generator 300 and the sub-blink ID using a Direct Sequence Spread Spectrum (DSSS) scheme. Then, the transmitter 303 transmits the modulated sub-blink signal to readers.

A locating method according to the related art traces a location of a target object by comparing arrival times of sub-blink signals and grouping the sub-blink signals based on the comparison result. Unlike the locating method according to the related art, when the reader receives the sub-blink signals transmitted from the RTLS tag, a location processor engine of the reader according to the present embodiment groups the received sub-blink signals by the sub-blink ID. Since the sub-blink IDs are generated according to the generation time order and inserted into each sub-blink signals, it is not required to compare arrival times of sub-blink signals in the present embodiment.

Figure 4:
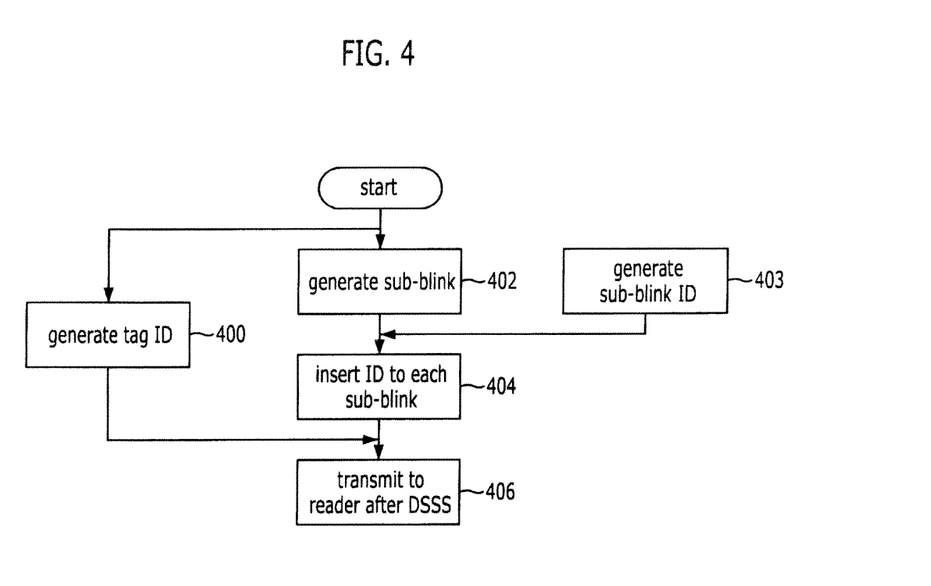
FIG. 4 is a flowchart illustrating a method of processing a blink signal transmitted from a RTLS tag in accordance with an embodiment of the present invention.

FIG. 4 is a flowchart illustrating a method of processing a blink signal transmitted from a RTLS tag in accordance with an embodiment of the present invention.

At step S400, the tag ID generator 300 generates a tag ID of a RTLS tag in order to regularly transmit the tag ID to a reader. At step S402, the blink generator 301 generates N sub-blinks. For example, the blink generator 301 may generate one to eight sub-blinks. In the step S402, the sub-blink ID generator 308 generates sub-blink IDs according to a generation time order of the sub-blinks.

At step S404, the sub-blink ID inserter 302 inserts the generated sub-blink IDs into corresponding sub-blink signals. At step S406, the transmitter 303 modulates the sub-blink signals having tag ID information and sub-blink ID information using a Direct Sequence Spread Spectrum scheme and transmits the modulated sub-blink signals to readers.

Figure 5:
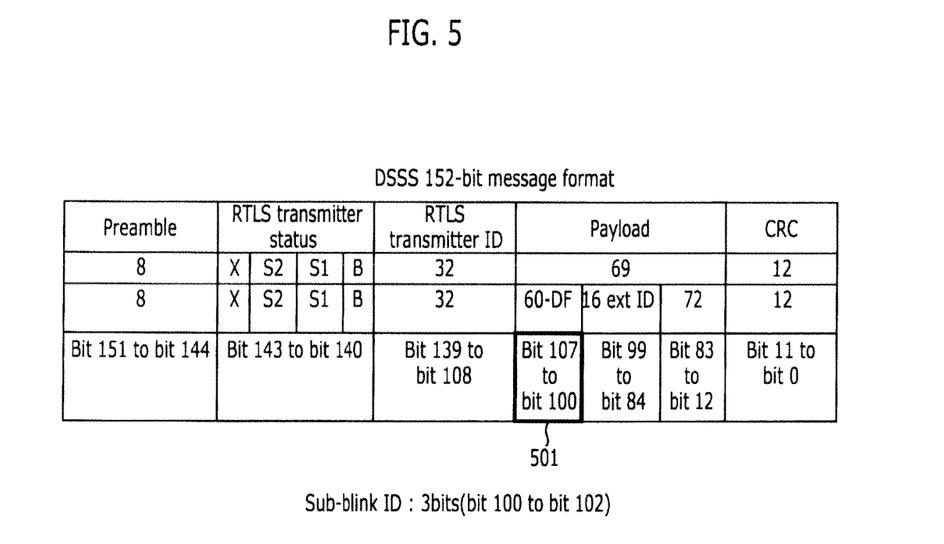
FIG. 5 is a diagram illustrating a structure of a sub-blink signal transmitted from a RTLS tag in accordance with an embodiment of the present invention.

FIG. 5 is a diagram illustrating a structure of a sub-blink signal transmitted from a RTLS tag in accordance with an embodiment of the present invention.

ISO/IEC 24730 has been preparing related standard for the Real Time Locating System (RTLS) based on ANSI/INCITS 371 which is US standard. In the present embodiment, 3-bits 501 in a payload of a 152-bit frame structure introduced in ISO/IEC 24730-2 are used to store and transmit maximum eight sub-blink IDs. Here, sub-blink ID information identically generated according to a generation time order may be assigned to sub-blink signals using the 3-bits 501 in the payload.

For example, one blink signal includes N sub-blink signals as shown in FIG. 1. Sub-blink IDs generated according to a generation time order of 1 to N sub-blink signals are inserted into each sub-blink signal. Accordingly, the present embodiment enables a location processor engine to omit comparing arrival times of sub-blink signals.

Figure 6:
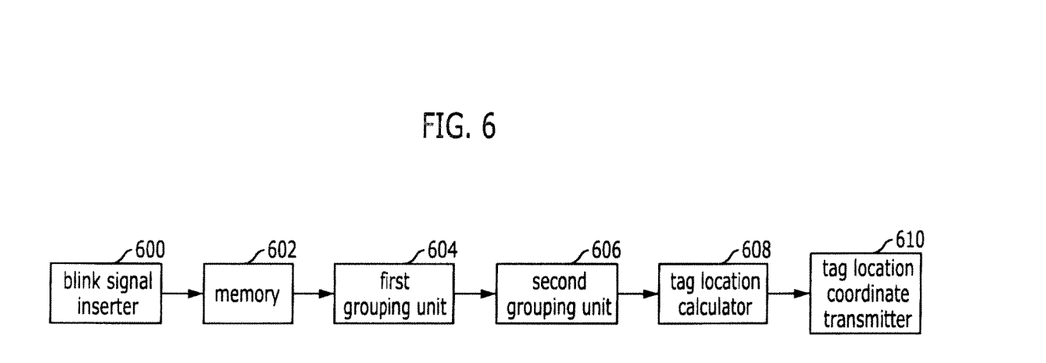
FIG. 6 is a block diagram illustrating an apparatus for locating a RTLS tag in accordance with an embodiment of the present invention.

FIG. 6 is a block diagram illustrating an apparatus for locating a RTLS tag in accordance with an embodiment of the present invention.

The apparatus for locating a RTLS tag according to the present embodiment includes a blink signal receiver 600, a memory 602, a first grouping unit 604, a second grouping unit 606, a tag location calculator 608, and a tag location coordinate transmitter 610.

The blink signal receive 600 receives a blink signal having sub-blink ID information, which is transmitted from a RTLS tag, through each reader. The memory 602 stores information about tag ID information, sub-blink ID information, and arrival times of the received blink signals.

The first grouping unit 604 groups the stored information in the memory 602 by a tag ID. That is, the stored information is grouped by the tag ID in order to detect a moving path of each RTLS tag by classifying the blink signals transmitted from various types of tags by the tag ID. After grouping the stored information by the tag ID, the second grouping unit 606 groups the tag ID-grouped information by the same sub-blink ID. That is, the tag ID-grouped information is grouped again by the same sub-blink ID in order to accurately detect a sub-blink arrival time like that a plurality of readers receive one sub-blink signal.

After grouping the information by the same sub-blink ID, it is determined whether the number of sub-blinks in each sub-blink ID is more than three or not. If the number of sub-blinks is less than three, it is impossible to trace a location. Accordingly, corresponding data is dumped without calculating a location of a tag. On the contrary, if the number of sub-blinks is more than three, the tag location calculator 608 calculates a location of an active tag using a predetermined location calculating method such as a TDOA based method with the sub-blink arrival time information. Although the TDOA based method is used in the present embodiment as the location calculating method, the present invention is not limited thereto. As the location calculating method, a RSSI based method, a TOA based method, and a TDOF based method may be used.

The tag location coordinate transmitter 601 transmits the calculated location of the RTLS tag with the tag ID to a server for managing a history of tag location. The server may be a computer having sufficient computing power. The server receives instructions from a user and transmits the instructions to a reader or analyzes tag information from a reader, calculates a location of the tag based on the analysis result, and stores the calculated tag location. The server may trace a location of a RTLS tag and inform a user of the location of the RTLS.

Figure 7:
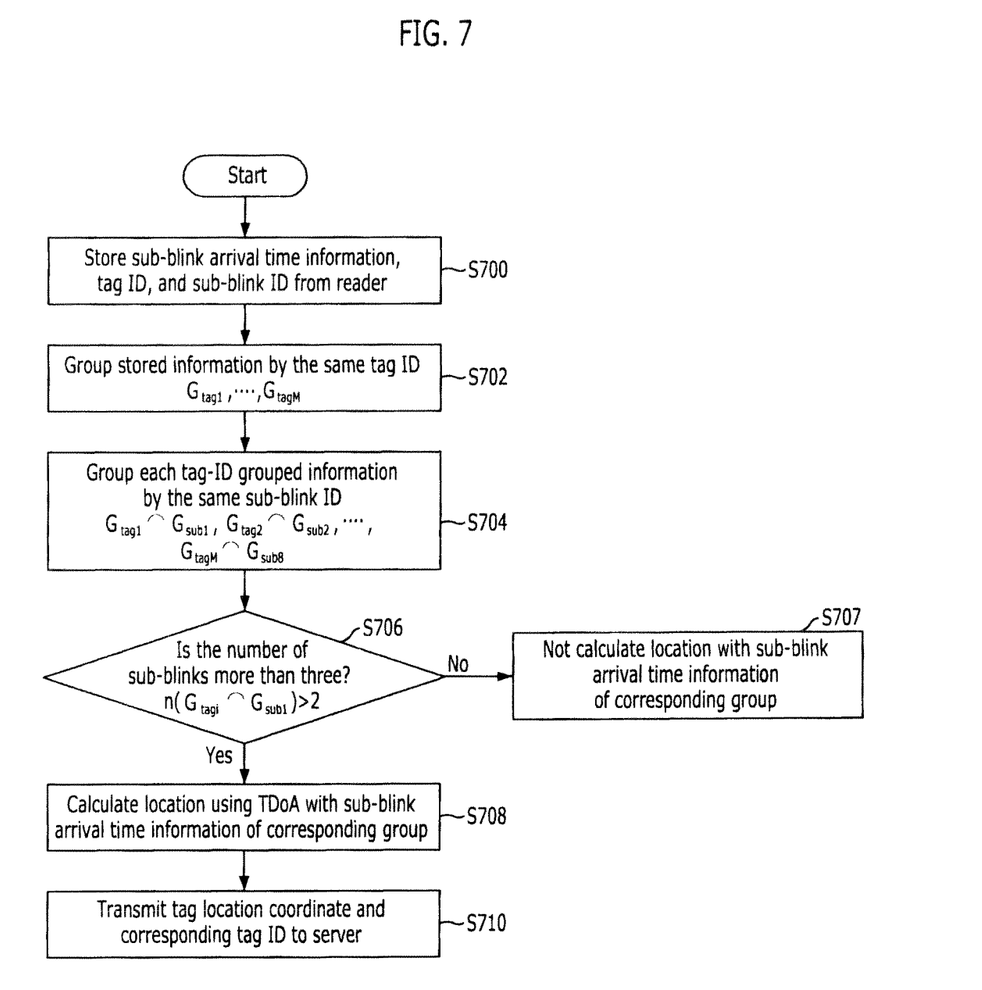
FIG. 7 is a flowchart illustrating a method of calculating a location of a tag in a location process engine in accordance with an embodiment of the present invention.

FIG. 7 is a flowchart illustrating a method of calculating a location of a tag in a location process engine when the location process engine receives a sub-blink signal having sub-blink ID information in accordance with an embodiment of the present invention.

A location processor engine receives a blink signal from a tag through a reader that is connected through a network. At step S700, the location processor engine according to the present embodiment stores tag ID information, sub-blink ID information, and sub-blink arrival time. At step S702, the location processor engine groups the stored information by a tag ID. That is, the location processor engine detects a moving path of each tag by dividing the blink signals transmitted from various types of tags. At step S704, the tag-ID grouped information is grouped by the same sub-blink ID again.

In the present embodiment, the sub-blink ID is generated and assigned according to a generation time order. Accordingly, the location processor engine can detect accurate sub-blink arrival time by grouping the tag-ID grouped information by the same sub-blink ID. Further, it is possible to omit a process of comparing the sub-blink arrival time information. Therefore, it is possible to fundamentally overcome a problem of wrongly calculating a location of a tag due to error caused by inaccurately grouping the information based on 10 μs.

At step S706, the number of sub-blinks is determined after the stored information is grouped by the sub-blink ID. If the number of sub-blinks is less than three at step S707, it is impossible to detect a location of a tag. Accordingly, the corresponding data is dumped without calculating the location thereof. On the contrary, if the number of sub-blinks is greater than three at step S708, a location of an active tag is calculated using a predetermined algorithm such as TDOA with sub-blink arrival time.

At step S710, the calculated location of the tag with the tag ID information is transmitted to a server for managing a history of locations of tag.

Figure 8:
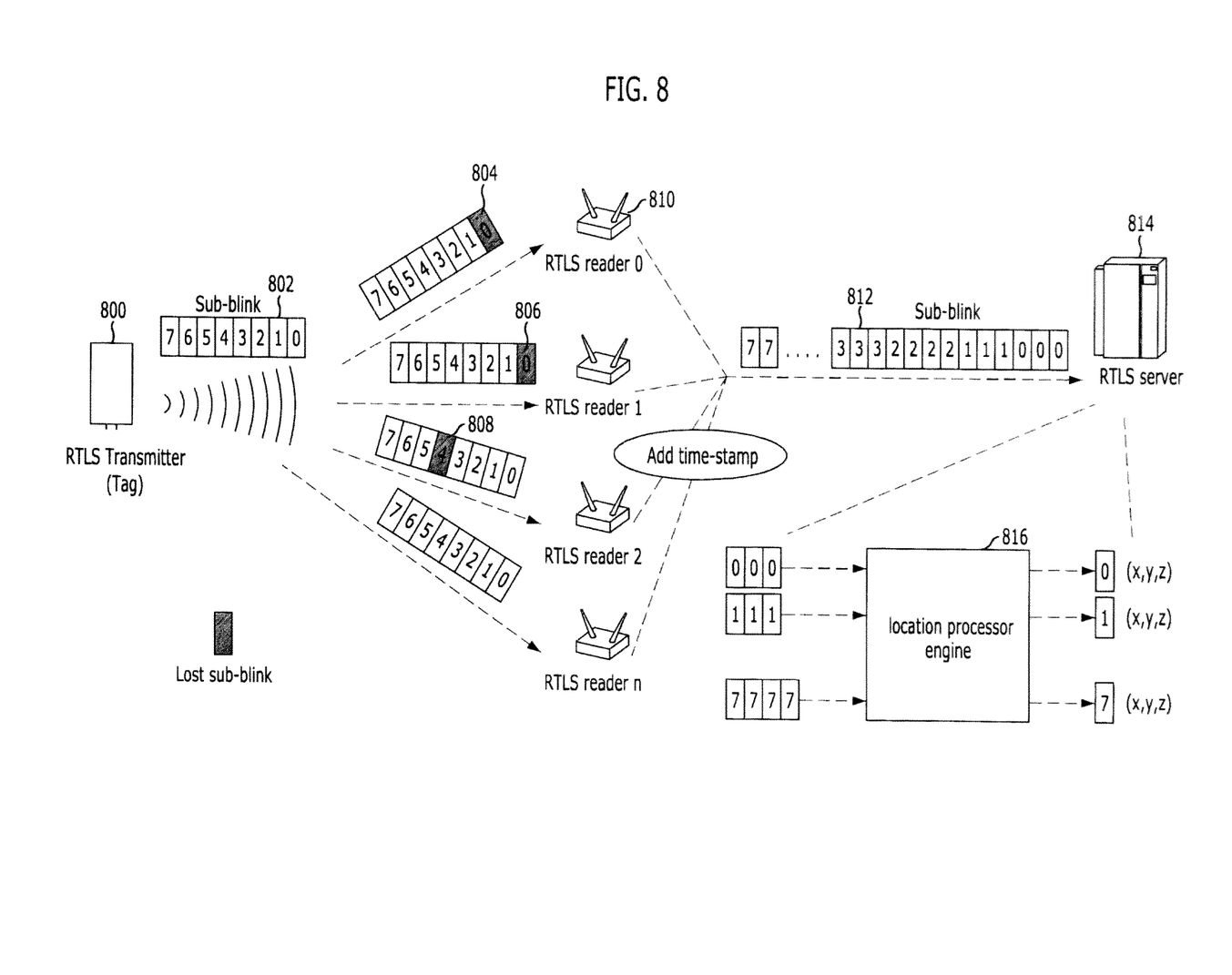
FIG. 8 is a diagram illustrating a procedure of processing data in a RTLS system in accordance with an embodiment of the present invention.

FIG. 8 is a diagram illustrating a procedure of processing data in a RTLS system in accordance with an embodiment of the present invention. In this embodiment, the number of sub-blinks 8.

The RTLS system according to the present embodiment includes a RTLS tag 800, a plurality of RTLS readers 810, a location processor engine 816, and a RTLS server 814.

The RTLS tag 800 generates a unique ID value of a tag through the tag ID generator 300. The blink generator 301 generates eight sub-blinks. The sub-blink ID generator 308 generates eight sub-blink IDs according to a generation time order of the sub-blink. The sub-blink ID inserter 302 inserts the sub-blink IDs into sub-blink signals.

The transmitter 303 modulates the sub-blink signals having the tag ID information and the sub-blink ID information using a DSSS scheme. Then, the transmitter 303 transmits the sub-blink signal 802 to the readers.

The blink signal 802 transmitted from the tag 800 is received through N RTLS readers 810. The blink signal receiver 600 of the location processor engine 816 receives the blink signal from the tag 800 through the readers 810 connected through a network. Then, the memory 602 stores the ID information of the tag 800 that transmits the blink signal, sub-blink ID information, and arrival time information of the sub-blink 802. The location processor engine 816 receives arrival time information and a tag ID value of the sub-blink 802 from N RTLS readers 810 and sequentially groups the received information through the first and second grouping units.

The first grouping unit 604 groups the stored information in the memory 602 by a tag ID. In order to detect a moving path of a related tag, the stored information is grouped by a tag ID.

Then, the second grouping unit 606 groups the tag-ID grouped information by the same sub-blink ID again to accurately detect the sub-blink arrival time like that a plurality of readers receive one sub-blink signal.

After finishing grouping, the grouped sub-blink signal 812 is generated. If there are more than three sub-blinks in the grouped sub-blink signal 812, the location processor engine 816 calculates an accurate location of an active tag 500 using the tag location calculator 608. The location processor engine 816 can calculates a location of a RTLS tag 800 using a predetermined method such as a TDOA based method based on the sub-blink arrival time information. The calculated location of the RTLS tag 800 is transmitted to the RTLS server 814 through the tag location coordinate transmitter 610.

Although one of sub-blinks 802 is lost in a predetermined reader, the RTLS server 814 can detect a location of a target tag because more than three sub-blinks are grouped according to the sub-blink ID and inputted.

As described above, the RTLS according to the present embodiment can quickly trace a location of a target tag because the RTLS does not compare blink signal arrival times generated from tags to calculate the location of the target tag.

While the present invention has been described with respect to the specific embodiments, it will be apparent to those skilled in the art that various changes and modifications may be made without departing from the spirit and scope of the invention as defined in the following claims.

What is claimed is:

1. A radio frequency identification (RFID) tag for transmitting a blink signal to locate a position of a target object, comprising:
    a tag ID generator configured to generate a tag ID of the RFID tag;
    a blink generator configured to generate a plurality of sub-blink signals that form the blink signal;
    a sub-blink ID generator configured to generate sub-blink IDs for the sub-blink signals;
    a sub-blink ID inserter configured to insert the sub-blink IDs into the sub-blink signals; and
    a transmitter configured to transmit the blink signal having the tag ID and the sub-blink IDs,
    wherein the sub-blink IDs are generated according to a generation time order for each of the sub-blink signals.

2. The RFID tag of claim 1, wherein the transmitter modulates the blink signal having the tag ID and the sub-blink IDs using a direct sequence spread spectrum scheme.

3. The RFID tag of claim 1, wherein the sub-blink ID is included in a payload of the sub-blink signal.

4. A method for controlling a radio frequency identification (RFID) tag, comprising:
    generating a tag ID of the RFID tag;
    generating a plurality of sub-blink signals that form the blink signal;
    generating sub-blink identifications (ID) for the sub-blink signals, and inserting the sub-blink IDs to the sub-blink signals; and
    transmitting the blink signals having the tag ID and the sub-blink IDs,
    wherein the sub-blink IDs are generated according to a generation time order for each of the sub-blink signals.

5. The method of claim 4, further comprising modulating the blink signal having the tag ID and the sub-blink IDs using a direct sequence spread spectrum (DSSS) signal.

6. The method of claim 4, wherein the sub-blink ID is included in a payload of the sub-blink signal.

7. An apparatus for locating a radio frequency identification (RFID) tag that transmits a blink signal, comprising:
    a blink signal receiver configured to receive a plurality of sub-blink signals having a tag ID and sub-blink IDs of each RFID tag from a plurality of radio RFID tags;
    a memory configured to store information including tag IDs and sub-blink IDs of each one of the plurality of sub-blink signals, and arrival time information of each one of the plurality of sub-blink signals;
    a first grouping unit configured to group the stored information by a same tag ID among the stored tag IDs;
    a second grouping unit configured to group the tag-ID grouped information by a same sub-blink ID among the stored sub-blink IDs; and
    a tag location calculator configured to calculates a coordinate of the RFID tag when the number of the grouped sub-blink IDS is more than three.

8. The apparatus of claim 7, further comprising a tag coordinate transmitter configured to transmit the calculated coordinate to a server for managing a history of locations of the RFID tag.

9. The apparatus of claim 7, wherein the tag coordinate calculator does not calculate a coordinate of the RFID tag when the number of the grouped sub-blink IDs is less than three.

10. The apparatus of claim 7, wherein the tag location calculator uses a time difference of arrival of the sub-blinks.

11. A method for tracking a location of a radio frequency identification (RFID) tag that transmits a blink signal, comprising:
    receiving a plurality of sub-blink signals including a tag ID and sub-blink IDs of each RFID tag from the plurality of RFID tags;
    storing information including the tag IDs, the sub-blink IDs, and arrival time information of the plurality of sub-blink signals;
    grouping the stored information by a same tag ID among the stored tag IDs;
    grouping the tag-ID grouped information by a same sub-blink ID among the stored sub-blink IDs; and
    calculating a coordinate of the RFID tag when the number of the grouped sub-blink IDS is more than three.

12. The method of claim 11, further comprising: transmitting the calculated coordinate to a server that manages a history of locations of a tag.

13. The method of claim 11, wherein in said calculating a coordinate of the RFID tag, a location coordinate of the RFID tag is not calculated when the number of the grouped sub-blink IDs is less than three.

14. The method of claim 11, wherein in said calculating a coordinate of the RFID tag, a time difference of arrival (TDOA) algorithm is used to arrival time information of the sub-blinks.

* * * * *